March 28, 1944.  J. F. HUNDLEY  2,345,478
BANK PROTECTION AND TRAP DEVICE
Filed Sept. 25, 1942  2 Sheets-Sheet 2
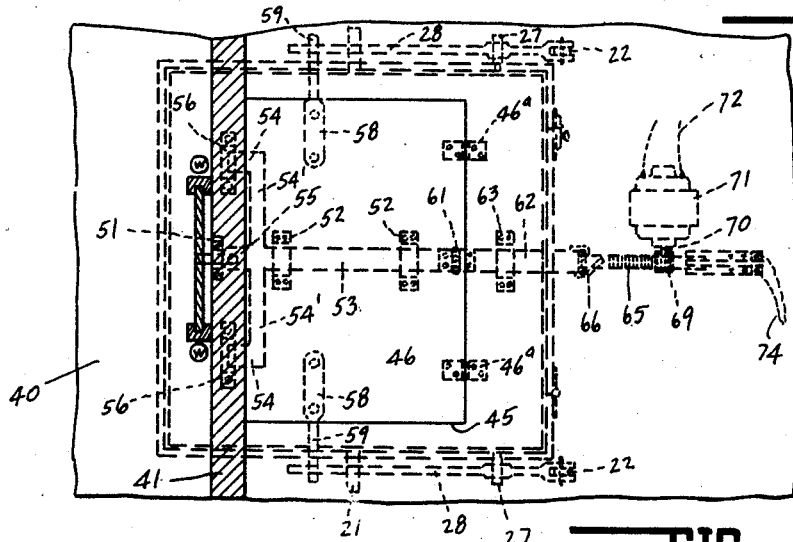
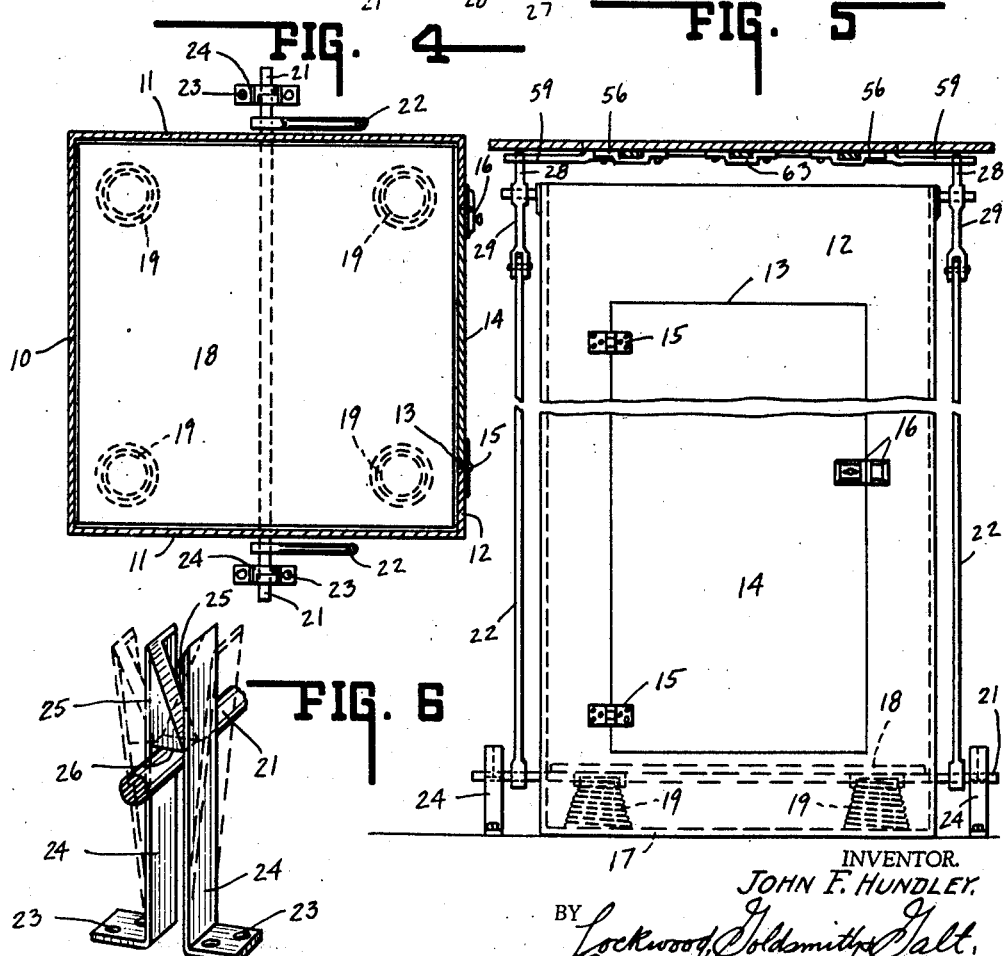
INVENTOR.
JOHN F. HUNDLEY.
BY Lockwood, Goldsmith & Galt.
ATTORNEYS.

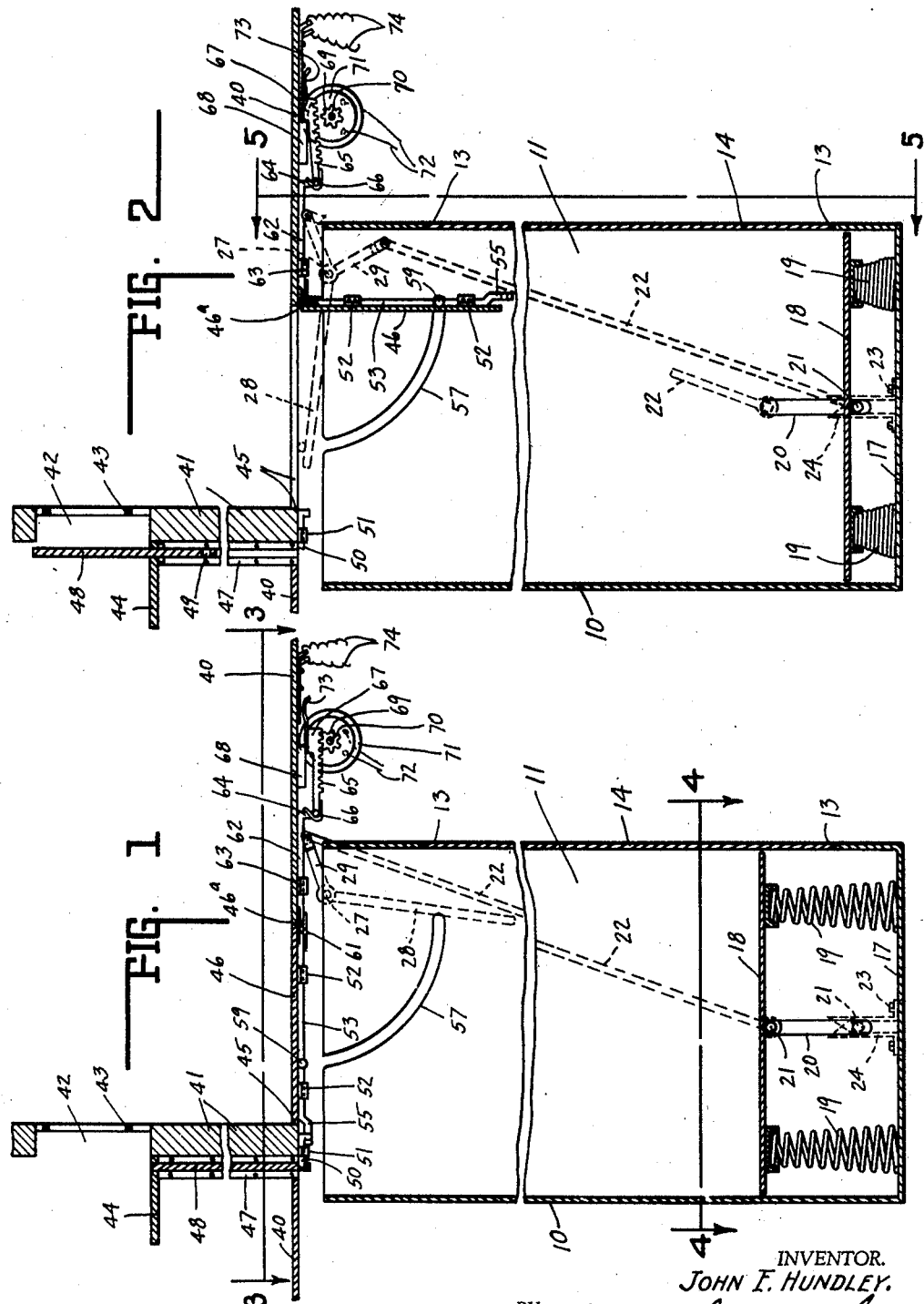

Patented Mar. 28, 1944

2,345,478

UNITED STATES PATENT OFFICE 2,345,478

BANK PROTECTION AND TRAP DEVICE

John F. Hundley, Indianapolis, Ind.

Application September 25, 1942, Serial No. 459,677

2 Claims. (Cl. 109—2)

This invention relates to combination trap and guard for simultaneously trapping a bank robber and protecting the teller.

The chief object of the present invention is to provide the aforesaid protection in such a manner that the bandit, when trapped, cannot escape.

The chief feature of the present invention includes the control of the trap door, etc.

Other objects and features of the invention will be set forth more fully hereinafter.

The full nature of the invention will be understood from the accompanying drawings and the following description and claims.

In the drawings

Fig. 1 is a vertical sectional view through the front of a teller's cage, the guard therefore, the bandit trap and trap door thereto, parts being shown in the normal position.

Fig. 2 is a similar view of the same parts in teller protecting and bandit trapping position.

Fig. 3 is in general a plan view taken approximately in the plane 3—3 of Fig. 1 and in the direction of the arrows.

Fig. 4 is a transverse sectional view of the trap chamber and movable floor and is taken approximately on line 4—4 of Fig. 1 and in the direction of the arrows.

Fig. 5 is in general an elevational view of the bandit removing door side of the trap chamber and is taken approximately on line 5—5 of Fig. 2 and in the direction of the arrows.

Fig. 6 is a perspective view of the movable platform operable latch, dotted lines indicating the release position.

In the several figures 10 indicates one wall, 11 a pair of opposite walls and 12 a fourth wall opposite the wall 10 and having a door opening 13 therein closed by an outside releasable hinged door 14 and hinged at 15 and locked as at 16 by way of conventional illustration.

This four sided chamber includes a bottom 17 and thereabove is a false bottom or platform 18 normally constrained upwardly by any number of suitable springs 19. Herein four corner springs are illustrated.

Each side wall 11 is vertically slotted at 20 and extending across the chamber and projecting through the slots is the bar 21. Bar 21 at each chamber exposed end pivotally supports an elongated link 22. Adjacent each projecting end of the bar and stationarily secured as at 23 is a pair of spaced resilient catches 24, each including a wedge shaped portion 25.

The confronting portions 25 cooperate with each other to yield, as shown by the dotted lines in Fig. 6, to pass downwardly the bar 21, but upon such passage to prevent upward movement of the bar 21, because then it is trapped by shoulders 26.

Pivoted at 27 to each side 11 of the chamber and externally thereof is a bell crank having an elongated arm 28 and a shorter arm 29 connected to the upper end of the adjacent link rod 22. Whenever the platform 18 is pressed downwardly by a weight in excess of the total upward constraint, the bar 21 is depressed therewith and is caught and held by the latches and in so doing the two bell cranks are simultaneously tilted to throw upwardly the arms 28 for a purpose hereinafter to be set forth.

It is obvious that this cage, as it were, can be made as a unit and is capable of installation in any desired location.

Reference will now be had to Figs. 1 and 2. Therein 40 indicates the floor of a bank, etc., 41 the wall forming the front of a teller's cage, 42 the teller's window opening, 43 the conventional grille guard therefor and 44 the shelf or platform adjacent the window opening.

In the floor 40, immediately in front of wall 41 and the opening 42, there is provided an opening 45. Hinged to the underface of the floor at 46a is a trap door 46 that normally closes this floor opening 42.

A pair of guides 47 slidably support a protecting window 48, or shatter and bullet-proof glass, or the like, normally constrained upwardly as by counter weights or springs. However, guard 48 is notched as at 49 and the bolt 50, normally constrained to latching position, holds the guard window down. When the bolt 50 is retracted against its immediate constraint, the guard constraint becomes effective to project the guard upwardly and protect the teller. The bolt is slidably supported by a guide means 51. The bolt 50 is released by the trap door releasing means.

Slidably supported in brackets 52 on the under face of trap door 46, see Fig. 3, is a draw bar 53, which adjacent wall 41 is provided with three spaced projections 54 and 55. The latter is in alignment with the draw bar 53 and bolt 50 and when the draw bar is retracted (moved to the right), see Figs. 1 and 2, the bolt 50 releases guard 48, and when the trap door drops, the bolt 50 is also released from the drawbar or actuator portion 55 thereof.

Portions 54 carried by cross bar portions 54' of drawbar 53 project into sockets 56 carried by the underface of the floor 40 beneath wall 41. When the drawbar 53 is retracted the trap door, due to its own weight and that of the robber or bandit thereon, drops into the trapping chamber previously described.

When the weight of the trapped person engages platform 18, the bar 21 is locked down which, as previously described, immediately throws upward the arms 28. Since each side wall 11 is slotted as at 57 and brackets 58 carried by the underface of the trap door have rod extensions 59 projecting therefrom and through slots 57 and these extensions 59 overlie arms 28, the trap door will immediately be thrown up and held up because of latches shown in Fig. 6. The cross bar 21 may carry guards to prevent bandit access through slots 20 to these latches if, as and when desired, and said guards would move with the cross-bar. Such guards would be only a plate.

There remains but to describe the draw bar release mechanism and its operation. Draw bar 53 is hingedly connected at 61 to an extension 62 slidably supported in guide bracket 63. The other end is angular at 64. A rack 65 is pivoted thereto at 66 and is spring constrained out of gear engagement. A lug 67 cooperates with block 68 to normally maintain the rack in pinion gear engagement when the draw bar 53 is projected for the trap door locking.

The pinion gear 69 is carried by shaft 70 motor driven as by motor 71 energized by wires 72 whenever a control switch, or push button at the teller's cage, or elsewhere is actuated. All control switches are in multiple. Same are not illustrated since this is conventional practice. Referring to Fig. 1, when any one of said control switches, not shown, is closed, the motor 71 is energized and pinion 69 is rotated to move rack 65 to the right, see Figs. 1 and 2.

In so doing when the bolt portions 54 are withdrawn from sockets 56, hinge 61 substantially registers with hinges 46a and the trap door drops and simultaneously the draw bar structure "breaks" at 61. When the rack 65 is moved sufficiently the lug 67 clears block 68. Thereupon the spring 66 becomes effective to disengage the rack from the pinion. At the same time lug 67 is effective to engage switch member 73 to close another and an alarm circuit, the wires being indicated by 74. Hence, the bell or siren alarm circuit is only energized after the trap door is sprung and the teller's guard is elevated. The bandit and his confederates accordingly are not audibly warned until the bandit is trapped.

It is obvious that the trapped bandit can do nothing to effect his release for the trap door is held elevated by locked bar 21 regardless of the position of the draw bar. The only way the bandit can be released is through the door 14. Following bandit removal the entire device may be reset by releasing latches 24—25—26 and returning the rack and draw bar to trap door latching position and lowering the teller's guard.

The trap chamber may be made of any suitable material, such as boiler plate, sheet steel, wood, concrete, etc., and, of course, suitably anchored in place relative to the trap door to secure the desired operation.

While the invention has been illustrated and described in great detail in the drawings and foregoing description, the same is to be considered as illustrative and not restrictive in character.

The several modifications described herein, as well as others, which will readily suggest themselves to persons skilled in this art, all are considered to be within the broad scope of this invention, reference being had to the appended claims.

The invention claimed is:

1. In combination a trap door in a floor, a trapping chamber therebeneath, a false floor in the chamber normally constrained upwardly and added weight movable downwardly, door release means, door closing means, means operatively connected to the false floor and operable in the lowering movement thereof to close the door, and latch means external of the chamber for latching the last mentioned means in door closing position.

2. In combination a trap door in a floor, a trapping chamber therebeneath, a false floor in the chamber normally constrained upwardly and added weight movable downwardly, door release means, door closing means, means operatively connected to the false floor and operable in the lowering movement thereof to close the door, and latch means external of the chamber for latching the last mentioned means in door closing position, the false floor operatively associated means comprising a member beneath the floor and movable therewith in initial downward movement of said false floor, said latch means when member actuated in false floor initial lowering retaining said member in lowered position regardless of subsequent false floor position.

JOHN F. HUNDLEY.